(12) United States Patent
Lu et al.

(10) Patent No.: US 11,657,187 B2
(45) Date of Patent: May 23, 2023

(54) METHOD FOR DISPLAYING SCREEN INFORMATION, DISPLAY DEVICE, AND STORAGE MEDIUM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Yu-Yong Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 113 days.

(21) Appl. No.: 17/388,650

(22) Filed: Jul. 29, 2021

(65) Prior Publication Data
US 2022/0382919 A1    Dec. 1, 2022

(30) Foreign Application Priority Data
May 28, 2021   (CN) .......................... 202110594500.2

(51) Int. Cl.
*G06F 21/84*   (2013.01)
*G06T 7/90*    (2017.01)
*G06F 3/14*    (2006.01)
*G06T 7/00*    (2017.01)
*G06T 11/00*   (2006.01)

(52) U.S. Cl.
CPC ................ *G06F 21/84* (2013.01); *G06F 3/14* (2013.01); *G06T 7/90* (2017.01); *G06T 7/97* (2017.01); *G06T 11/001* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 7,184,063 B2* | 2/2007 | Shum .................... | G06T 11/001 345/640 |
| 2014/0267363 A1* | 9/2014 | Kocienda ............ | G06F 3/04847 345/592 |
| 2019/0258784 A1* | 8/2019 | Betz ........................ | G06F 21/31 |

* cited by examiner

*Primary Examiner* — Edward Martello
(74) *Attorney, Agent, or Firm* — ScienBiziP, P.C.

(57) ABSTRACT

A method for displaying screen information includes obtaining visitor information of a visitor of a display device. Once a page to be visited by the visitor is determined, a current color scheme for at least one controllable element of the page to be visited is determined according to the visitor information and a page type of the page to be visited.

20 Claims, 8 Drawing Sheets

METHOD FOR DISPLAYING SCREEN INFORMATION, DISPLAY DEVICE, AND STORAGE MEDIUM

FIELD

The present disclosure relates to information security technology field, and particular to a method for displaying screen information, a display device, and a storage medium.

BACKGROUND

Information security issues become more and more important. Computer devices often store a large amount of confidential information such as corporate internal data or users' personal information. This confidential information can be stolen by taking photos, videos, screenshots, file transfers, etc. In the event of a leakage of the confidential information occurred, it is difficult for a victim to find a source of the leakage, which results a great threat to an owner of the confidential information.

At present, a confidentiality level or a prompt information of a file is displayed as a watermark on each page of the file to achieve a warning effect. However, this solution presents problems: all users use a same watermark, and the user cannot be traced through the watermark; the watermark may be changed; and the watermark may affect an aesthetics of the page.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
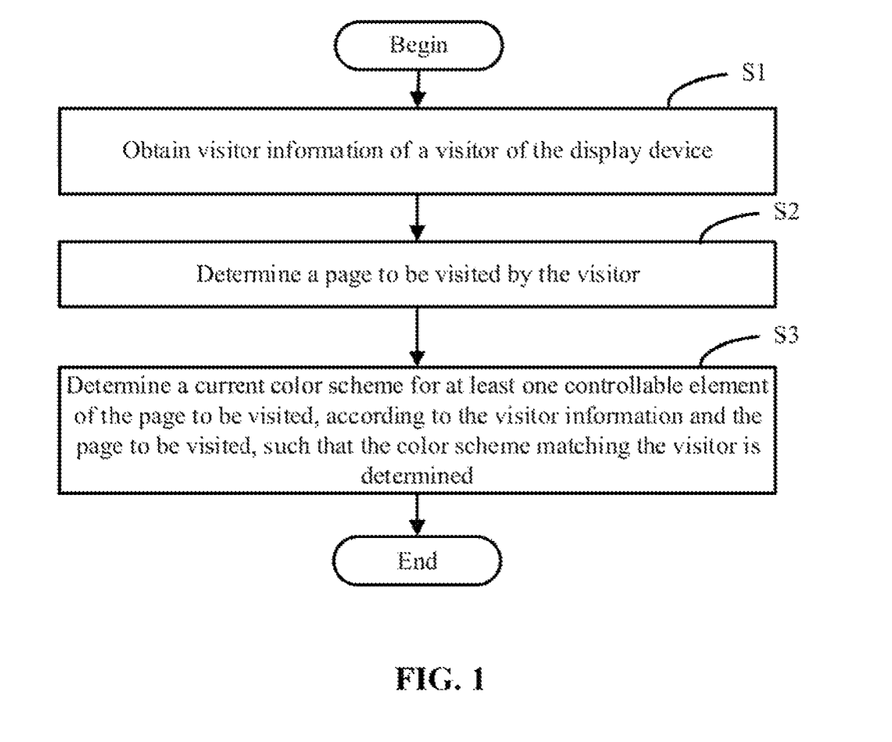
FIG. 1 is a schematic flowchart of a method for displaying screen information provided by an embodiment of the present disclosure.

FIG. 1 shows a schematic flowchart of a method for displaying screen information provided by an embodiment of the present disclosure. According to different needs, an order of the blocks in the flowchart can be changed, and some blocks can be omitted. For ease of description, only blocks related to the embodiments of the present disclosure are shown.

Figure 9:
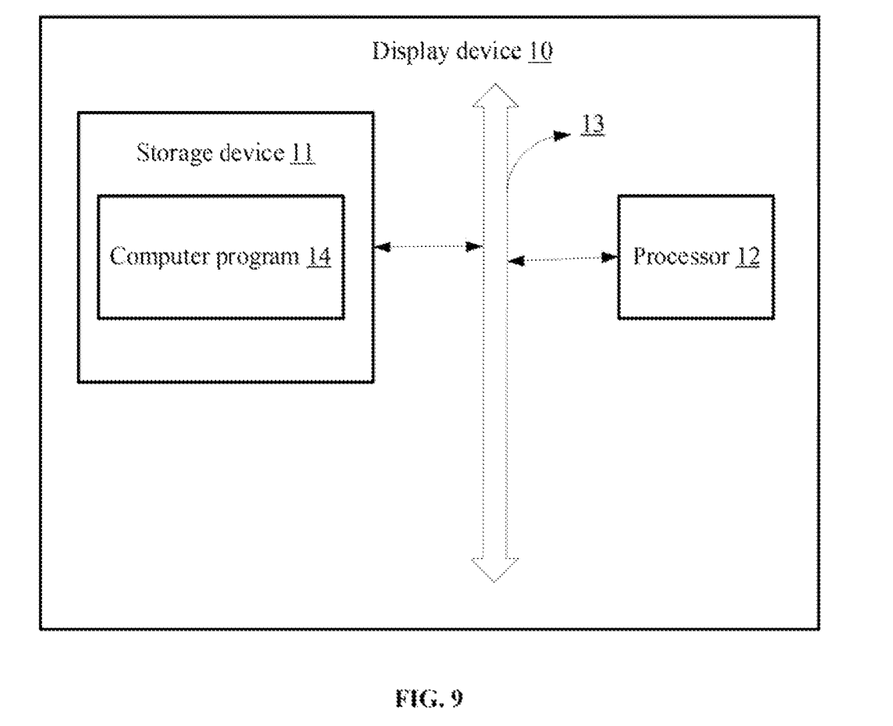
FIG. 9 shows a schematic block diagram of one embodiment of a display device of the present disclosure.

In one embodiment, the method for displaying screen information can be applied to a display device (e.g., a display device 10 in FIG. 9). For a display device that needs to perform a function of displaying screen information, the function for displaying screen information provided by the method of the present disclosure can be directly integrated on the display device, or run on the display device in the form of a software development kit (SDK).

In an embodiment of the present disclosure, the display device has a display screen, and the display device can display information through the display screen, or the display device can be connected to a display screen which can display information of the display device. The method for displaying screen information includes the following blocks. The screen information can be defined be information that can be displayed on the display screen.

At block S1, the display device obtains visitor information of a visitor of the display device.

In one embodiment, the visitor information includes a visitor identifier f the visitor and a visit time of the visitor. In one embodiment, the visitor identifier is used to identify the visitor, and the visitor identifier can be a user name of the visitor used to access the display device. The visit time can be a current time the visitor logins in the display device using the user name.

In one embodiment, the visitor information further includes a device identifier, the device identifier can be used to identify a device used by the visitor, and the device identifier may be an IP address or a MAC address of the device used by the visitor. The device used by the visitor can be wirely or wirelessly connected with the display device.

At block S2: the display device determines a page to be visited by the visitor. The page includes at least one controllable element, the controllable element refers to an element of which a color that can be controlled.

In one embodiment, the page to be visited i.e., a page that the visitor will browse. For example, if a URL is entered in a browser, a home page corresponding to the URL can be determined as the page to be visited. Then then content of the page is the screen information.

In one embodiment, the at least one controllable element includes one or more elements, such as at least one button, at least one menu, at least one line, a background, a text, and/or a combination thereof.

At block S3: the display device determines a current color scheme for the at least one controllable element of the page to be visited, according to the visitor information and the page to be visited, such that the color scheme matching the visitor is determined.

In one embodiment, the display device can determine the current color scheme for the at least one controllable element of the page to be visited, according to the visitor information and a page type of the page to be visited.

In one embodiment, the display device can determine different color schemes based on different visitors and different page types. Such that a one-to-one correspondence between the visitor information and the page to be visited is established.

Further, since different pages may have different layouts, different contents, and different page types, the color schemes of the at least one controllable element of different pages can be different.

In this way, through the one-to-one correspondence between the color scheme of the at least one controllable element of each page and the visitor information, a visitor who have visited a certain page can be determined according to the color scheme of the at least one controllable element of the certain page, and a traceability of the certain page can be realized.

Figure 2:
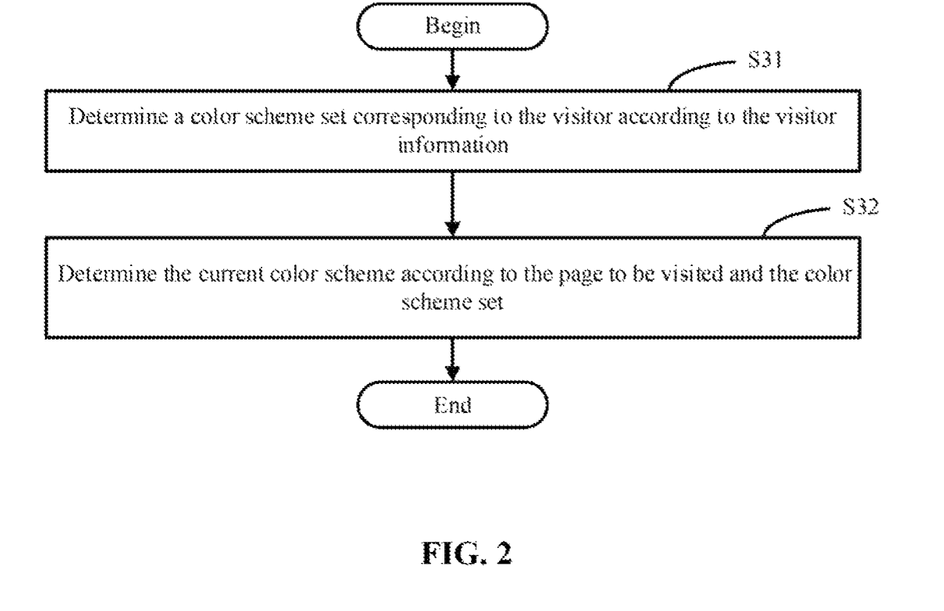
FIG. 2 is a schematic flowchart of a method for determining a color scheme provided by an embodiment of the present disclosure.

In an embodiment, referring to FIG. 2, block S3 specifically includes blocks S31-S32:

At block S31: the display device determines a color scheme set corresponding to the visitor according to the visitor information.

In one embodiment, the color scheme set includes a plurality of color schemes that can be used by the visitor.

At block S32: the display device determines the current color scheme according to the page to be visited and the color scheme set.

In one embodiment, each visitor corresponds a color scheme set, and each color scheme set includes a plurality of color schemes, such that different visitors can be distinguished through the color scheme.

Furthermore, each visitor corresponds to a color scheme set, each visitor visiting different pages or visiting a same page at different times can be allocated with a different color scheme. Of course, in actual applications, the same visitor visiting different pages or visiting the same page at different times can also allocate the color scheme based on the page, as long as different visitors can be distinguished by the color scheme of the at least one controllable element of the page.

Figure 3:
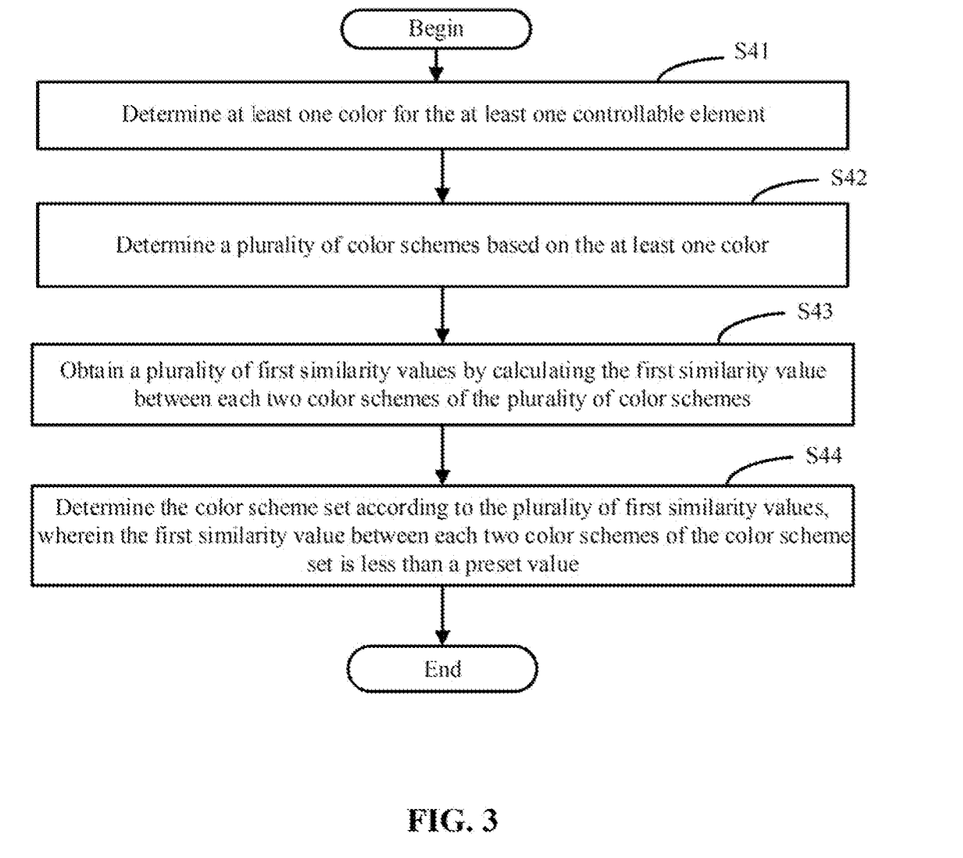
FIG. 3 is a schematic flowchart of a method of determining a color scheme set provided by an embodiment of the present disclosure.

In an embodiment, referring to FIG. 3, the determining of the color scheme set includes blocks S41-S44:

At block S41: the display device determines at least one color for the at least one controllable element.

Specifically, the display device determines the at least one color according to an industry type of screen information to be displayed on the display device, and/or a color preference of the visitor. Of course, the at least one color can also be determined according to other factors, such as customs, a working environment, and so on.

At block S42: the display device determines a plurality of color schemes based on the at least one color.

Specifically, the display device can determine different color schemes according to different colors.

For example, if the at least one color includes only one color and the only one color is red, and the at least one controllable element includes only one element and the only one element is a button, since different types of red color have different RGB values, the display device can determine a plurality of color schemes based on a combination of the different RGB values of red color and the button. Such that when different visitors visit the page, the color of the button can be different, i.e., different visitors can be allocated with different color schemes.

Of course, if the at least one color includes a plurality of colors, such as blue color and green color, and the at least one controllable element includes a plurality of elements, such as buttons, lines (such as borders), fonts, etc., then some of the plurality of elements can be allocated with a same color, for example, buttons and fonts can be allocated with a same color such as dark blue. The plurality of elements can also be allocated with different colors, for example, buttons can be allocated with dark blue, fonts can be allocated with light blue. The elements having a same type can also be allocated with the same or different colors. This disclosure does not limit the color scheme of the at least one controllable element, as long as different visitors can be distinguished by the color scheme of the at least one controllable element.

At block S43: the display device obtains a plurality of first similarity values by calculating the first similarity value between each two color schemes of the plurality of color schemes.

Specifically, the display device obtains the first similarity value between the each two color schemes using a similarity algorithm such as an Euclidean distance method, or a Manhattan distance method.

In one embodiment, if the page to be visited includes a plurality of elements such a plurality of buttons or lines, the display device can obtain the first similarity value between the each two color schemes by first determining a matrix of each of the two color scheme; and calculating the first similarity value according to the matrix of each of the two color scheme.

At block S44: the display device determines the color scheme set according to the plurality of first similarity values, wherein the first similarity value between each two color schemes of the color scheme set is less than a preset value.

In this way, each visitor corresponds to a color scheme set, so that the visitors can be distinguished according to the color scheme.

In this way, a difference between the color schemes of different visitors can be enhanced, and a recognition of different color schemes can be increased.

Figure 4:
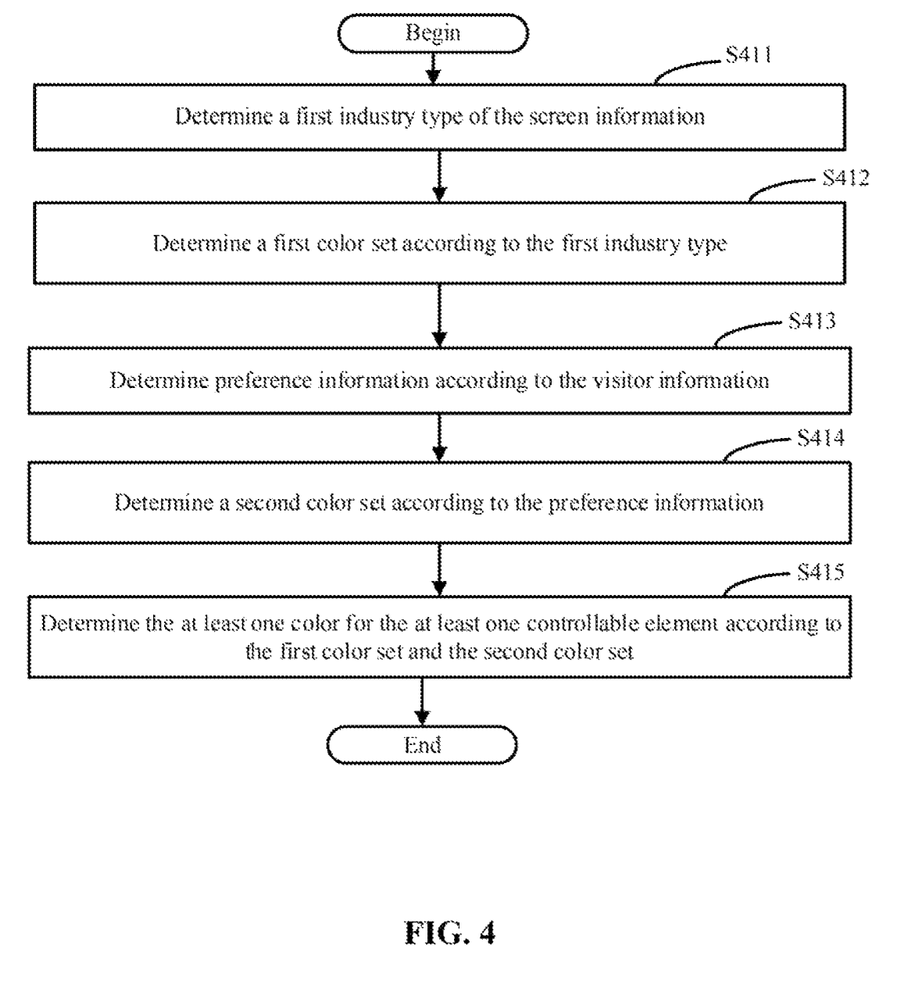
FIG. 4 is a schematic flowchart of a method for determining available colors provided by an embodiment of the present disclosure.

Referring to FIG. 4, in an embodiment, block S41 specifically includes blocks S411-S415:

At block S411: the display device determines a first industry type of the screen information.

In one embodiment, the first industry type of the screen information can be determined according to an industry of a user of the display device. For example, if the user of the display device is a medical staff, the first industry type can be a medical industry. If the user of the display device is a teacher, the first industry type can be an education industry.

Further, the first industry type can be pre-configured in the display device, and of course, the first industry type can also be configured and adjusted based on different users.

At block S412: the display device determines a first color set according to the first industry type.

Specifically, the display device predefines different industry types corresponding to different color preferences. For example, the display device predefines the medical industry corresponding to green and white; and predefines a communication industry corresponding to blue. Of course, the color preference of an industry can also be configured and adjusted according to actual application scenarios.

At block S413: the display device determines preference information according to the visitor information.

In an embodiment, the visitor information includes color preference, and the color preference is preference information.

In an embodiment, the visitor information may include user habits, gender, etc., and the display device can determine a preferred color of the visitor by means of machine learning based on the visitor information.

At block S414: the display device determines a second color set according to the preference information.

At block S415: the display device determines the at least one color for the at least one controllable element according to the first color set and the second color set.

In one embodiment, the display device determines the color that is included in both the first color set and the second color set as the at least one color for the at least one controllable element. For example, if the first color set includes red color and blue color, and the second color set includes red color and green color, then the display device determines the red color as the at least one color for the at least one controllable element.

In an embodiment, the determining the current color scheme according to the page to be visited and the color scheme set includes:

The display device determines a second industry type to which the page to be visited belongs;

The display device determines a third color set based on the second industry type;

The display device determines a current color scheme based on the color scheme set and the third color set.

In this way, the user experience is enhanced, and pages having different types have different color schemes, so as to improve an identification of the page to be visited, and it is convenient to distinguish different pages according to the color scheme.

Figure 5:
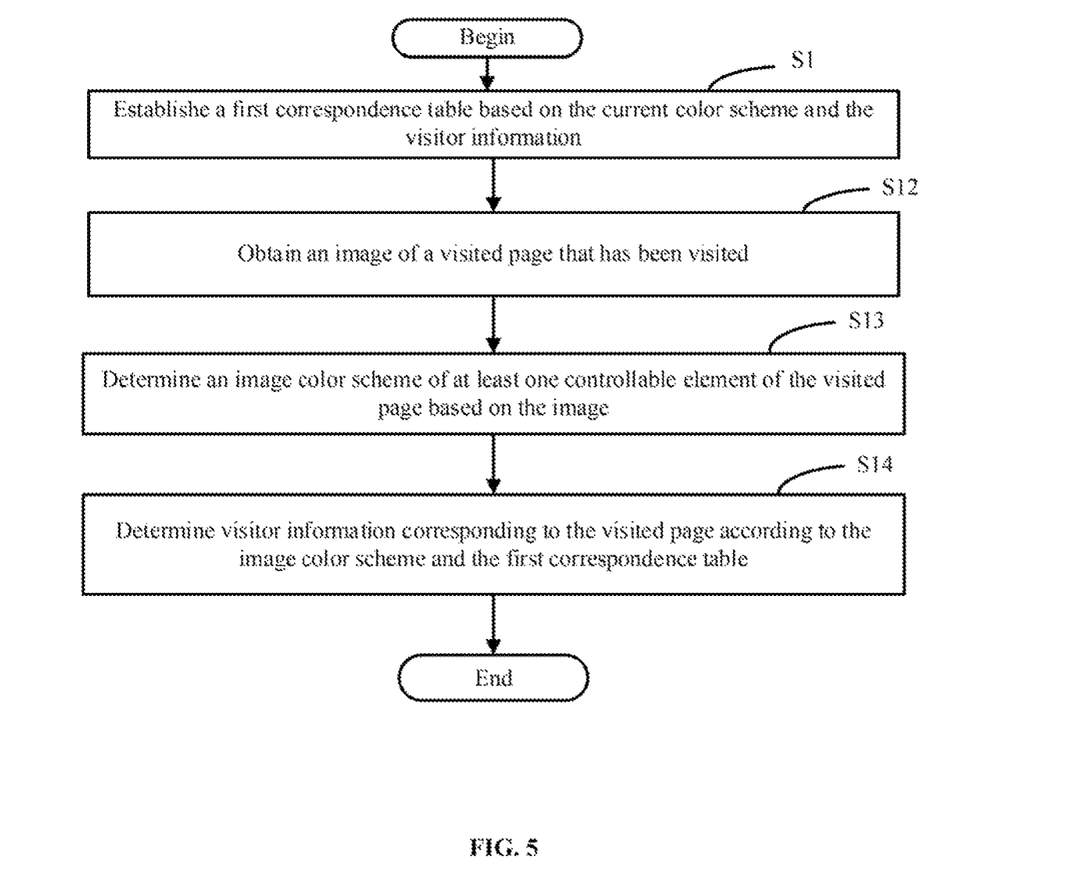
FIG. 5 is a schematic flowchart of a method for determining a leaker provided by an embodiment of the present disclosure.

In an embodiment, referring to FIG. 5, the method further includes the blocks S11-S15:

At block S11: the display device establishes a first correspondence table based on the current color scheme and the visitor information.

In an embodiment, block S11 specifically includes:

Determining a first identifier based on the visitor information:

Acquiring a color difference matrix of the current color scheme;

Determining a second identifier according to the color difference matrix;

Establishing the first correspondence table based on the first identifier and the second identifier.

Specifically, the display device converts the visitor information and the color scheme into identification information, such that it is easy to save, and the security of the information can be improved.

At block S12: when the page has been visited by a visitor, the display device obtains an image of the page (the page that has been visited hereafter referred to as "visited page").

The image can be captured when the page is displayed on the display device and is visited by a visitor, or the image can be a screenshot of a video that is obtained by capturing the display device when the page is displayed on the display device.

At block S13: the display device determines a color scheme of the at least one controllable element of the visited page based on the image (the color scheme of the at least one controllable element of the visited page hereinafter referred to as "image color scheme").

In one embodiment, the display device can determine the image color scheme by identifying a color of the at least one controllable element using image recognition algorithm.

At block S14: the display device can determine visitor information corresponding to the visited page according to the image color scheme and the first correspondence table.

Specifically, if there is a certain color scheme recorded in the first correspondence table matching the image color scheme, the display device can determine the visitor information corresponding to the certain color scheme in the first correspondence as the visitor information corresponding to the visited page, the certain color scheme can be any one of color schemes recorded in the first correspondence table. If there is no color scheme recorded in the first correspondence table matching the image color scheme, the display device can determine that there is no visitor information in the first correspondence table corresponding to the visited page.

Figure 6:
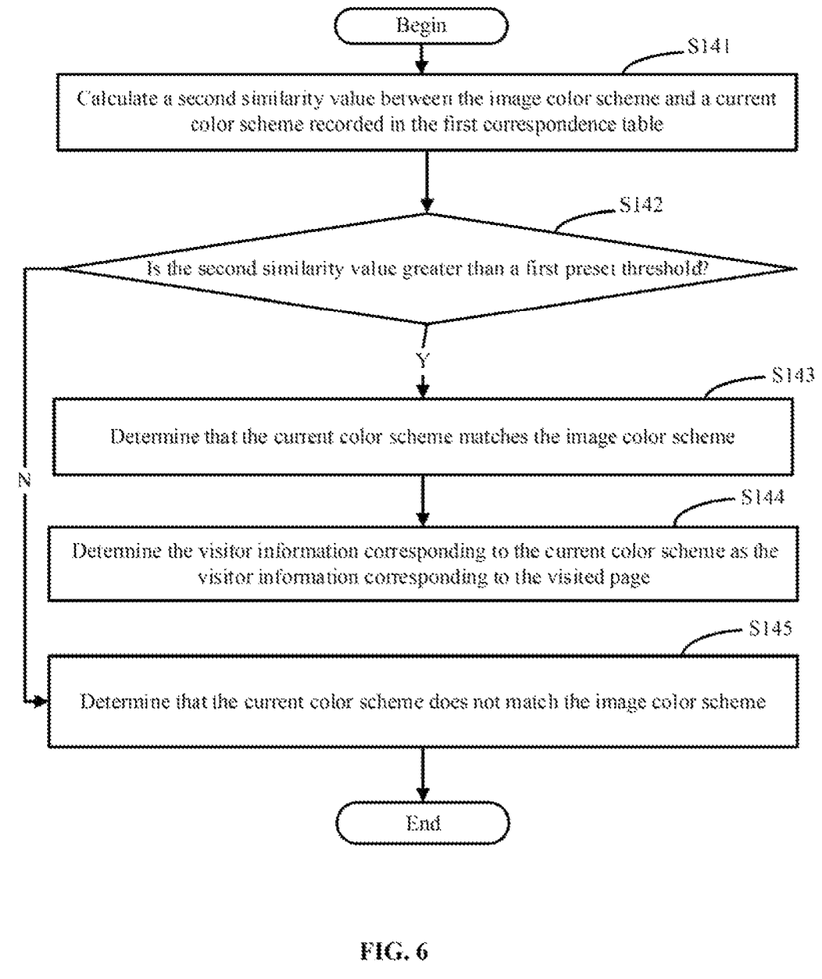
FIG. 6 is a schematic flowchart of a method for matching a color scheme provided by a first embodiment of the present disclosure.

In an embodiment, referring to FIG. 6, block S14 specifically includes blocks S141-S144:

At block S141: the display device can calculate a second similarity value between the image color scheme and a current color scheme recorded in the first correspondence table.

At block S142: the display device can determine whether the second similarity value is greater than a first preset threshold.

If the second similarity value is greater than the first preset threshold, block S143 is performed. If the second similarity value is less than or equal to the first preset threshold, block S145 is performed.

At block S143: the display device can determine that the current color scheme matches the image color scheme.

At block S144: when the current color scheme matches the image color scheme, the display device can determine the visitor information corresponding to the current color scheme as the visitor information corresponding to the visited page.

At block S145: the display device can determine that the current color scheme does not match the image color scheme.

Specifically, it should be noted that the current color scheme does not match the image color scheme may be because of a brightness or a conversion function (such as automatic beauty, etc.) of a shooting device when the shooting device captures the image. By setting the first preset threshold, it improves a fault tolerance and an applicability.

In an embodiment, when the at least one controllable element includes a plurality of elements, block S141 specifically includes:

Obtaining a plurality of third similarity values by calculating the third similarity value between each element of the image and each corresponding element of the visited page;

Obtaining an average value of all the plurality of third similarity values;

Determining the average value as the second similarity value, i.e., a similarity value between the visited page and the image.

For example, if the at least one controllable element of the visited page includes a plurality of elements, such as a plurality of buttons and a plurality of lines, the display device can calculate a third similarity value between each button in the image and each corresponding button in the visited page; and calculate a third similarity value between each line in the image and each corresponding line in the visited page. It should be noted that a button in the visited page being corresponding to a button in the image means that a position of the button in the image is same as a position of the corresponding button in the visited page. Similarly, a line in the visited page being corresponding to a line in the image means that a position of the line in the image is same as a position of the corresponding line in the visited page.

Figure 7:
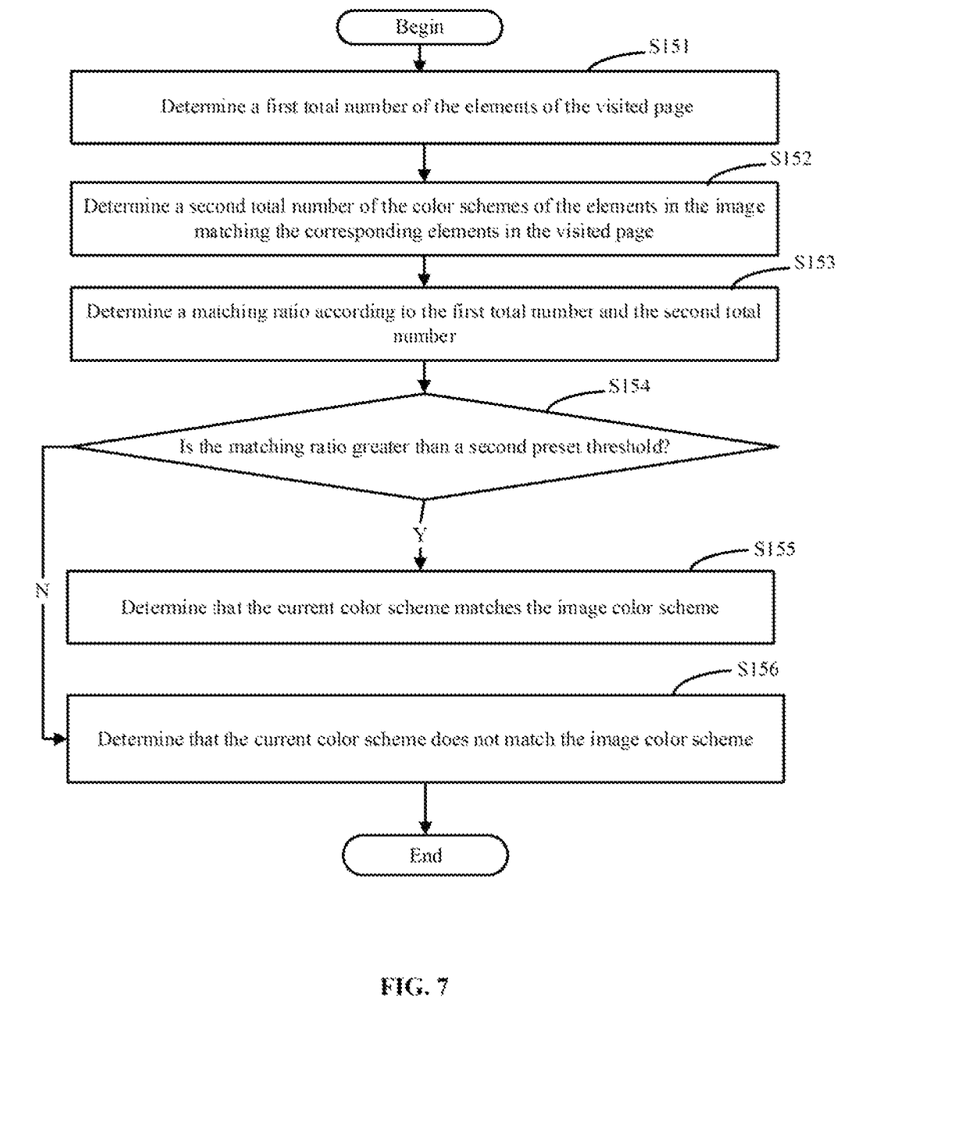
FIG. 7 is a schematic flowchart of a method for matching a color scheme provided by a second embodiment of the present disclosure.

In an embodiment of the present disclosure, referring to FIG. 7, the method further includes:

At block S151: the display device determines a first total number of the elements of the visited page, the visited page is corresponding to the image.

At block S152: the display device determines a second total number of the color schemes of the elements in the image matching the corresponding elements in the visited page.

Specifically, if a similarity between the color scheme of the element in the image and the corresponding element in the visited page is greater than the first preset threshold, the display device determines that the color scheme of the element in the image matches the corresponding element in the visited page.

At block S153: the display device determines a matching ratio according to the first total number and the second total number.

For example, if first total number equals 10, and the second total number equals 5, then the matching ratio equals 50%.

At block S154: the display device determines whether the matching ratio is greater than a second preset threshold.

The second preset threshold can be set according to an actual scene, for example, the second preset threshold can be set as 60%.

If the matching ratio is greater than the second preset threshold, block S155 is performed.

At block S155, the display device determines that the current color scheme matches the image color scheme.

If the matching ratio is less than or equal to the second preset threshold, block S156 is performed.

At block S156, the display device determines that the current color scheme does not match the image color scheme.

In this way, by setting the second preset threshold, the image can be compared with part of the visited page, such that the present disclosure can prevent the leaker from cropping the image or partially processing the image.

In an embodiment, before block S13, the method further includes:

Determining a conversion type of the image;

Obtaining an original image of the image by inversely converting the image according to the conversion type.

Specifically, if the image was ever converted, then the color scheme of the image may be changed. The conversion type may include grayscale conversion, nostalgic effect conversion, decolorization effect conversion or high saturation conversion, etc. The conversion type can be determined by human eye recognition or machine recognition. Through the inverse conversion process, to obtain the original image, so that the original image and the first correspondence table can be matched and compared.

In an embodiment, the screen information further includes an identification code, and the display device can generate the identification code according to the visitor information; and display the identification code on the page to be visited. The identification code may be a two-dimensional code, a barcode, or a micro-identification (symbol, number, etc.).

Figure 8:
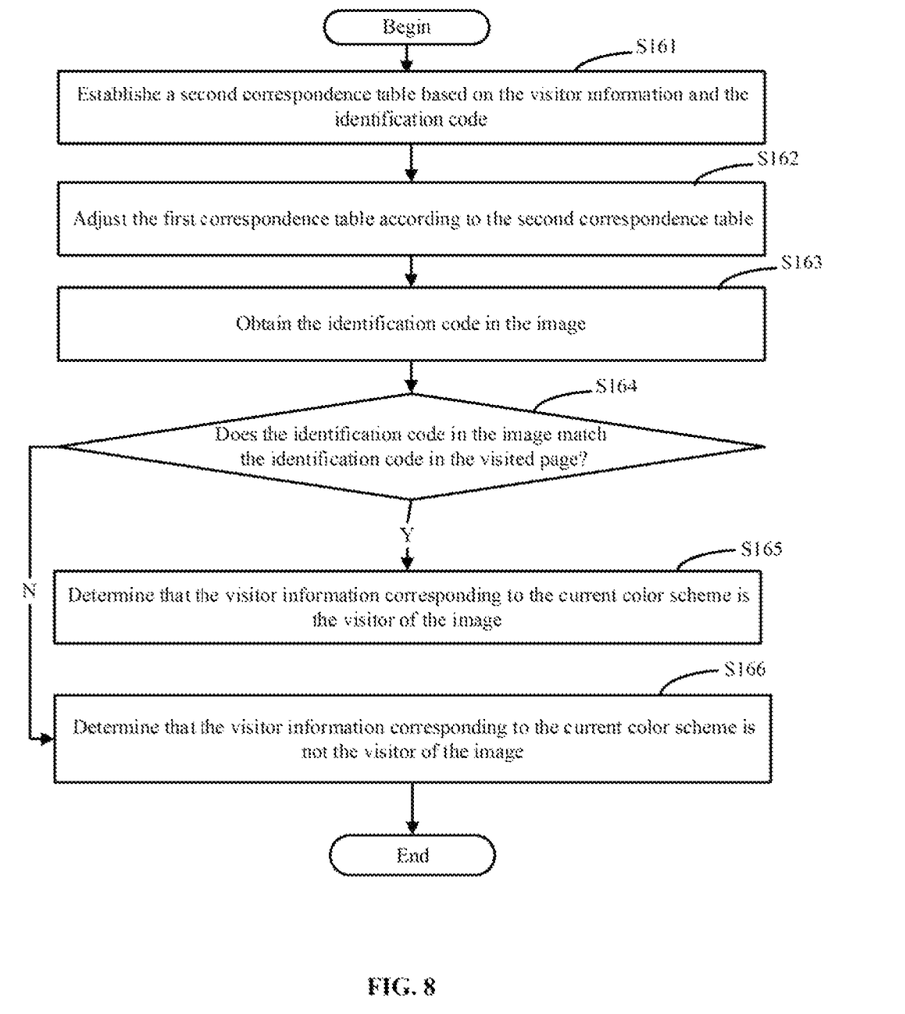
FIG. 8 is a schematic flowchart of a method for implementing matching a color scheme based on an identification code provided by an embodiment of the present disclosure.

Referring to FIG. 8, the method further includes:

At block S161: the display device establishes a second correspondence table based on the visitor information and the identification code.

At block S162: the display device adjusts the first correspondence table according to the second correspondence table.

Specifically, the display device adjusts the first correspondence table by establishing a relationship between the visitor information and the identification code in the first correspondence table.

At block S163: the display device obtains the identification code in the image.

Further, if there is no identification code in the image, the display device directly determines that the image does not match the visited page.

At block S164: the display device determines whether the identification code in the image matches the identification code in the visited page.

If the identification code in the image matches the identification code in the visited page, block S165 is performed.

At block S165, the display device determines that the visitor information corresponding to the current color scheme is the visitor of the image.

If the identification code in the image does not match the identification code in the visited page, block S166 is performed.

At block S166, the display device determines that the visitor information corresponding to the current color scheme is not the visitor of the image.

In this way, by adding the identification code to the visited page, and a combination of the identification code and the color scheme, the accuracy of matching can be improved.

FIG. 1 describes in detail the method for displaying screen information of the present disclosure. Through the method, the visitor can be identified through the color scheme of the controllable element of the screen information. The following describes the architecture of the hardware device that implements the method for displaying screen information with reference to FIG. 9. It should be understood from the above content that the embodiments are only for illustrative purposes, and are not limited by this structure in the scope of the present disclosure.

FIG. 9 shows a schematic block diagram of an embodiment of the display device of the present disclosure. The display device 10 includes a storage device 11, a processor 12, and a communication bus 13. The storage device 11 is communicatively connected with the processor 12 through the communication bus 13.

The display device 10 also includes a computer program 14 stored in the storage device 11 and is executed by the processor 12.

When the processor 12 executes the computer program 14, the blocks of the method for displaying screen information is realized. Alternatively, the processor 12 executes the computer program 14 to implement the functions of each module/unit in the embodiment.

Exemplarily, the computer program 14 may be divided into one or more modules/units, and the one or more modules/units are stored in the storage device 11 and executed by the processor 12 to complete this disclosure. The one or more modules/units may be a series of computer program instruction segments capable of completing specified functions, and the instruction segments are used to describe the execution process of the computer program 14 in the display device 10.

It is understandable that FIG. 9 is only an example of the display device 10, and does not constitute a limitation on the display device 10. The display device 10 may include more or less components than those shown in the FIG. 9, or include different components, for example, the display device 10 may also include input devices and the like.

The processor 12 may be a central processing unit (CPU), and may also include other general-purpose processors, digital signal processors (DSPs), application specific integrated circuits (ASICs), Field-programmable gate array (FPGA) or other programmable logic devices, discrete gates or transistor logic devices, discrete hardware components, etc. The general-purpose processor can be a microprocessor or the processor can also be any conventional processor, etc. The processor 12 is a control center of the display device 10, which uses various interfaces and lines to connect various parts of the display device 10.

The storage device 11 may be used to store the computer program 14 and/or modules/units. The processor 12 runs or executes the computer programs and/or modules/units stored in the storage device 11, and calls the computer programs and/or modules/units stored in the storage device 11, and realizes various functions of the display device 10. The storage device 11 may include an external storage medium, and may also include a memory. In addition, the storage device 11 may include a high-speed random access memory, and may also include a non-volatile storage device, such as a hard disk, a memory, a plug-in hard disk, a smart media card (SMC), and a Secure Digital (SD) Card, Flash Card, at least one magnetic disk storage device, flash memory device, or other volatile solid-state storage device.

If the integrated modules/units of the display device 10 are implemented in the form of software functional units and sold or used as independent products, they can be stored in a computer readable storage medium. Based on this understanding, this disclosure implements all or part of the processes in the embodiments and methods described in this disclosure, and can also be completed by instructing relevant hardware through a computer program. The computer program can be stored in a computer-readable storage medium. When the computer program is executed by a processor, it can implement the blocks of the various method embodiments. It should be noted that the content contained in the computer-readable medium can be appropriately added or deleted according to the requirements of the legislation and patent practice in the jurisdiction. For example, in some jurisdictions, according to the legislation and patent practice, the computer-readable medium does not include electrical carrier signals and telecommunication signals.

It should be emphasized that the above-described embodiments of the present disclosure, including any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for displaying screen information applied to a display device, comprising:
   obtaining visitor information of a visitor of the display device, the visitor information comprising a visitor identifier that the visitor used to access the display device, a visit time that the visitor logging in the display device using the visitor identifier, and a device identifier of a device being connected with the display device that is used by the visitor;
   determining a page to be visited by the visitor, the page comprising at least one controllable element; and
   determining a current color scheme for the at least one controllable element, according to the visitor information and the page to be visited, wherein different color schemes are allocated for the at least one controllable element when the visitor visits the page to be visited at different times, and different color schemes are allocated for the at least one controllable element when different visitors visit the page to be visited.

2. The method according to claim 1, wherein the determining the current color scheme for the at least one controllable element according to the visitor information and the page to be visited comprises:
   determining a color scheme set corresponding to the visitor according to the visitor information, the color scheme set comprising a plurality of color schemes; and
   determining the current color scheme according to the page to be visited and the color scheme set.

3. The method according to claim 2, wherein the determining of the color scheme set comprises:
   determining at least one color for the at least one controllable element;
   determining the plurality of color schemes based on a combination of different RGB values of the at least one color and the at least one controllable element;
   obtaining a plurality of first similarity values by calculating the first similarity value between each of the two color schemes of the plurality of color schemes; and
   determining the color scheme set according to the plurality of first similarity values; wherein the first similarity value between each of the two color schemes of the color scheme set is less than a preset value.

4. The method according to claim 3, wherein the determining at least one color for the at least one controllable element comprises:
   determining a first industry type of screen information of the display device;
   determining a first color set according to the first industry type;
   determining preference information according to the visitor information;
   determining a second color set according to the preference information; and
   determining the at least one color for the at least one controllable element according to the first color set and the second color set.

5. The method according to claim 3, wherein the determining the current color scheme according to the page to be visited and the color scheme set comprises:
   determining a second industry type to which the page to be visited belongs;
   determining a third color set based on the second industry type; and
   determining a current color scheme based on the color scheme set and the third color set.

6. The method according to claim 1, wherein the at least one controllable element comprises at least one button, at least one menu, at least one line, a background, a text, and/or a combination thereof.

7. The method according to claim 1, further comprising:
   generating an identification code according to the visitor information; and displaying the identification code on the page to be visited, wherein the identification code is a two-dimensional code, a barcode, or a micro-identification.

8. The method according to claim 1, further comprising:
establishing a first correspondence table based on the current color scheme and the visitor information;
obtaining an image of a visited page;
determining an image color scheme of at least one controllable element of the visited page by identifying a color of the at least one controllable element on the image using image recognition algorithm; and
determining visitor information corresponding to the visited page according to the image color scheme and the first correspondence table.

9. The method according to claim 8, wherein the determining visitor information corresponding to the visited page according to the image color scheme and the first correspondence table comprising:
calculating a second similarity value between the image color scheme and a current color scheme recorded in the first correspondence table;
determining whether the second similarity value is greater than a first preset threshold;
determining that the current color scheme matches the image color scheme when the second similarity value is greater than the first preset threshold; and
determining the visitor information corresponding to the current color scheme as the visitor information corresponding to the visited page when the current color scheme matches the image color scheme.

10. The method according to claim 9, wherein when the at least one controllable element comprises a plurality of elements, the calculating the second similarity value between the image color scheme and the current color scheme recorded in the first correspondence table comprises:
obtaining a plurality of third similarity values by calculating the third similarity value between each element of the image and each corresponding element of the visited page;
obtaining an average value of all the plurality of third similarity values; and
determining the average value as the second similarity value.

11. The method according to claim 10, further comprising:
determining a first total number of the elements of the visited page;
determining a second total number of the color schemes of the elements in the image matching the corresponding elements in the visited page;
determining a matching ratio according to the first total number and the second total number; and
determining that the current color scheme matches the image color scheme when the matching ratio is greater than a second preset threshold.

12. The method according to claim 8, wherein before determining the color scheme of the at least one controllable element of the visited page based on the image, the method further comprises:
determining a conversion type of the image; and
obtaining an original image of the image by inversely converting the image according to the conversion type.

13. The method according to claim 8, wherein the establishing the first correspondence table based on the current color scheme and the visitor information comprises:
determining a first identifier based on the visitor information;
determining a second identifier according to the current color scheme; and
establishing the first correspondence table based on the first identifier and the second identifier.

14. The method according to claim 8, wherein the screen information further comprises an identification code which is generated according to the visitor information, wherein the method further comprises:
establishing a second correspondence table based on the visitor information and the identification code;
adjusting the first correspondence table according to the second correspondence table;
obtaining the identification code in the image; and
determining that the visitor information corresponding to the current color scheme is the visitor of the image, when the identification code in the image matches an identification code in the visited page.

15. A display device comprising:
a storage device;
at least one processor; and
the storage device storing one or more programs, which when executed by the at least one processor, cause the at least one processor to:
obtain visitor information of a visitor of the display device, the visitor information comprising a visitor identifier that the visitor used to access the display device, a visit time that the visitor logging in the display device using the visitor identifier, and a device identifier of a device being connected with the display device that is used by the visitor;
determine a page to be visited by the visitor, the page comprising at least one controllable element; and
determine a current color scheme for the at least one controllable element, according to the visitor information and the page to be visited, wherein different color schemes are allocated for the at least one controllable element when the visitor visits the page to be visited at different times, and different color schemes are allocated for the at least one controllable element when different visitors visit the page to be visited.

16. The display device according to claim 15, wherein the determining the current color scheme for the at least one controllable element according to the visitor information and the page to be visited comprises:
determining a color scheme set corresponding to the visitor according to the visitor information, the color scheme set comprising a plurality of color schemes; and
determining the current color scheme according to the page to be visited and the color scheme set.

17. The display device according to claim 16, wherein the determining of the color scheme set comprises:
determining at least one color for the at least one controllable element;
determining the plurality of color schemes based on a combination of different RGB values of the at least one color and the at least one controllable element;
obtaining a plurality of first similarity values by calculating the first similarity value between each of the two color schemes of the plurality of color schemes; and
determining the color scheme set according to the plurality of first similarity values; wherein the first similarity value between each of the two color schemes of the color scheme set is less than a preset value.

18. The display device according to claim 17, wherein the determining at least one color for the at least one controllable element comprises:
  determining a first industry type of screen information of the display device;
  determining a first color set according to the first industry type;
  determining preference information according to the visitor information;
  determining a second color set according to the preference information; and
  determining the at least one color for the at least one controllable element according to the first color set and the second color set.

19. The display device according to claim 17, wherein the determining the current color scheme according to the page to be visited and the color scheme set comprises:
  determining a second industry type to which the page to be visited belongs;
  determining a third color set based on the second industry type; and
  determining a current color scheme based on the color scheme set and the third color set.

20. A non-transitory storage medium having instructions stored thereon, when the instructions are executed by a processor of a display device, the processor is configured to perform a method for displaying screen information, wherein the method comprises:
  obtaining visitor information of a visitor of the display device, the visitor information comprising a visitor identifier that the visitor used to access the display device, a visit time that the visitor logging in the display device using the visitor identifier, and a device identifier of a device being connected with the display device that is used by the visitor;
  determining a page to be visited by the visitor, the page comprising at least one controllable element; and
  determining a current color scheme for the at least one controllable element, according to the visitor information and the page to be visited, wherein different color schemes are allocated for the at least one controllable element when the visitor visits the page to be visited at different times, and different color schemes are allocated for the at least one controllable element when different visitors visit the page to be visited.

* * * * *